(12) United States Patent
Chen et al.

(10) Patent No.: US 10,856,384 B2
(45) Date of Patent: Dec. 1, 2020

(54) LIGHTING SYSTEM WITH CONFIGURABLE COLOR TEMPERATURES

(71) Applicant: ABL IP Holding LLC, Atlanta, GA (US)

(72) Inventors: Feng Chen, Hoffman Estates, IL (US); Towfiq M. Chowdhury, Lake Forest, IL (US)

(73) Assignee: ABL IP Holding LLC, Atlanta, GA (US)

( * ) Notice: Subject to any disclaimer, the term of this patent is extended or adjusted under 35 U.S.C. 154(b) by 0 days.

(21) Appl. No.: 15/991,209

(22) Filed: May 29, 2018

(65) Prior Publication Data

US 2019/0373699 A1    Dec. 5, 2019

(51) Int. Cl.
| | | |
|---|---|---|
| *H05B 33/08* | (2020.01) | |
| *H05B 37/02* | (2006.01) | |
| *H05B 45/20* | (2020.01) | |
| *H05B 45/37* | (2020.01) | |
| *H05B 47/10* | (2020.01) | |

(52) U.S. Cl.
CPC ............. *H05B 45/20* (2020.01); *H05B 45/37* (2020.01); *H05B 47/10* (2020.01)

(58) Field of Classification Search
CPC ............ H05B 33/0815; H05B 33/0818; H05B 33/0884; H05B 33/0809; H05B 33/0848; H05B 33/0896; H05B 37/0245; H05B 37/0254; H05B 33/0863; H05B 33/0872; H05B 33/0803; H05B 37/0272; H05B 33/0857; H05B 33/0887; H05B 45/20; H05B 45/37; H05B 45/44; H05B 45/46; H05B 47/10; H05B 45/50

USPC ................................ 315/294, 291, 224, 307
See application file for complete search history.

(56) References Cited

U.S. PATENT DOCUMENTS

| | | | |
|---|---|---|---|
| 6,201,351 B1 | 3/2001 | Rudolph et al. | |
| 6,323,598 B1 * | 11/2001 | Guthrie | H05B 45/37 315/200 A |
| 6,995,355 B2 | 2/2006 | Rains, Jr. et al. | |
| 7,014,336 B1 | 3/2006 | Ducharme et al. | |
| 7,416,312 B1 | 8/2008 | McDermott | |

(Continued)

FOREIGN PATENT DOCUMENTS

| | | |
|---|---|---|
| CN | 106555981 | 4/2017 |
| EP | 2768283 | 8/2014 |

(Continued)

OTHER PUBLICATIONS

U.S. Appl. No. 16/022,892, "Non-Final Office Action," dated Oct. 29, 2018, 6 pages.

(Continued)

*Primary Examiner* — Amy Cohen Johnson
*Assistant Examiner* — Syed M Kaiser
(74) *Attorney, Agent, or Firm* — Kilpatrick Townsend & Stockton LLP

(57) ABSTRACT

Certain aspects involve lighting systems in which the color temperature of the illumination can be selectively modified. In one example, a lighting system can include a set of light sources. The lighting system can also include a switching device. The switching device can connect different light sources from the set into light-source combinations having different color temperatures, respectively. A light-source combination can include two of the light sources connected in series.

11 Claims, 9 Drawing Sheets

(56) References Cited

U.S. PATENT DOCUMENTS

| | | |
|---|---|---|
| 7,497,590 B2 | 3/2009 | Rains, Jr. et al. |
| 7,520,634 B2 | 4/2009 | Ducharme et al. |
| 7,883,239 B2 | 2/2011 | Rains, Jr. et al. |
| 8,172,415 B2 | 5/2012 | Wegh et al. |
| 8,203,260 B2 | 6/2012 | Li et al. |
| 8,228,002 B2 * | 7/2012 | Newman, Jr. .......... H05B 39/08 315/291 |
| 8,317,362 B2 | 11/2012 | Ku et al. |
| 8,373,362 B2 | 2/2013 | Chemel et al. |
| 8,436,549 B2 | 5/2013 | Hasnain |
| 8,598,809 B2 | 12/2013 | Negley et al. |
| 8,638,045 B2 | 1/2014 | Kunst et al. |
| 8,669,722 B2 | 3/2014 | Yeh et al. |
| 8,710,754 B2 | 4/2014 | Baddela et al. |
| 8,791,642 B2 * | 7/2014 | van de Ven ............ H05B 45/44 315/192 |
| 8,872,438 B2 | 10/2014 | Zhou et al. |
| 8,890,436 B2 | 11/2014 | Chou |
| 8,914,312 B2 | 12/2014 | Mclaughlin et al. |
| 8,941,312 B2 | 1/2015 | Mcrae |
| 9,125,271 B2 | 9/2015 | Martins et al. |
| 9,210,760 B2 | 12/2015 | Sanders et al. |
| 9,277,607 B2 | 3/2016 | Ramer et al. |
| 9,289,269 B2 | 3/2016 | Valteau et al. |
| 9,414,457 B2 | 8/2016 | Fukuda et al. |
| 9,544,951 B1 | 1/2017 | O'Neil et al. |
| 9,719,642 B1 | 8/2017 | Macias |
| 9,730,291 B1 | 8/2017 | Janik et al. |
| 9,801,250 B1 | 10/2017 | Halliwell |
| 9,820,350 B2 | 11/2017 | Pyshos et al. |
| 9,892,693 B1 | 2/2018 | Kumar et al. |
| 9,900,945 B1 | 2/2018 | Janik et al. |
| 10,091,855 B2 | 10/2018 | Van Winkle |
| 10,117,300 B2 | 10/2018 | Doheny et al. |
| 10,163,405 B2 | 12/2018 | Kumar et al. |
| 10,299,337 B1 | 5/2019 | Chen et al. |
| 10,448,471 B1 | 10/2019 | Chowdhury et al. |
| 2005/0162851 A1 | 7/2005 | Kazar et al. |
| 2005/0243022 A1* | 11/2005 | Negru .................... H05B 45/20 345/46 |
| 2006/0220586 A1 | 10/2006 | Latham |
| 2006/0226795 A1* | 10/2006 | Walter ................... H05B 45/00 315/312 |
| 2006/0238136 A1 | 10/2006 | Johnson, III et al. |
| 2006/0285310 A1 | 12/2006 | Shyu |
| 2007/0159750 A1* | 7/2007 | Peker .................... H05B 47/20 361/93.1 |
| 2007/0262724 A1* | 11/2007 | Mednik ................. H05B 45/48 315/125 |
| 2008/0130298 A1 | 6/2008 | Negley et al. |
| 2009/0026913 A1 | 1/2009 | Mrakovich |
| 2009/0218960 A1* | 9/2009 | Lyons ................... H05B 45/48 315/297 |
| 2009/0256483 A1 | 10/2009 | Gehman et al. |
| 2010/0141175 A1* | 6/2010 | Hasnain ............... H05B 47/185 315/294 |
| 2010/0207534 A1 | 8/2010 | Dowling et al. |
| 2010/0214764 A1 | 8/2010 | Chaves et al. |
| 2010/0283322 A1 | 11/2010 | Wibben |
| 2010/0308738 A1* | 12/2010 | Shteynberg ............ H05B 45/48 315/185 R |
| 2011/0058372 A1* | 3/2011 | Lerman ................ H05K 1/0204 362/235 |
| 2011/0062872 A1 | 3/2011 | Jin et al. |
| 2011/0068702 A1 | 3/2011 | Van de Ven et al. |
| 2011/0084615 A1* | 4/2011 | Welten .................. H05B 45/48 315/152 |
| 2011/0115407 A1 | 5/2011 | Wibben et al. |
| 2011/0210678 A1* | 9/2011 | Grajcar ................. H05B 45/20 315/192 |
| 2012/0080944 A1 | 4/2012 | Recker et al. |
| 2012/0081009 A1* | 4/2012 | Shteynberg ........... H05B 45/10 315/122 |
| 2012/0098460 A1 | 4/2012 | Miyasaka et al. |
| 2012/0242247 A1 | 9/2012 | Hartmann et al. |
| 2012/0253542 A1* | 10/2012 | Nurmi .................... H05B 45/44 700/299 |
| 2012/0286753 A1 | 11/2012 | Zhong et al. |
| 2013/0021580 A1* | 1/2013 | Morgan ................ G03B 33/06 353/31 |
| 2013/0038222 A1* | 2/2013 | Yeh ........................ H05B 45/22 315/152 |
| 2013/0049610 A1* | 2/2013 | Chen ...................... G08B 5/36 315/159 |
| 2013/0082616 A1* | 4/2013 | Bradford ............... H05B 45/58 315/193 |
| 2013/0140988 A1 | 6/2013 | Maxik et al. |
| 2013/0141013 A1* | 6/2013 | Kodama ................ H01L 24/97 315/294 |
| 2013/0200806 A1* | 8/2013 | Chobot ................. H05B 47/19 315/151 |
| 2013/0229125 A1 | 9/2013 | Yan et al. |
| 2013/0249422 A1 | 9/2013 | Kerstens et al. |
| 2013/0328500 A1 | 12/2013 | Toda |
| 2013/0343052 A1 | 12/2013 | Yen |
| 2014/0001959 A1 | 1/2014 | Motley et al. |
| 2014/0035472 A1* | 2/2014 | Raj ........................ H05B 45/22 315/185 R |
| 2014/0042920 A1 | 2/2014 | Chou |
| 2014/0210357 A1* | 7/2014 | Yan ....................... H05B 45/46 315/186 |
| 2014/0252967 A1 | 9/2014 | van de Ven et al. |
| 2014/0312777 A1 | 10/2014 | Shearer et al. |
| 2015/0009666 A1 | 1/2015 | Keng et al. |
| 2015/0097489 A1* | 4/2015 | Wu ........................ H05B 45/46 315/122 |
| 2015/0245441 A1 | 8/2015 | McCune, Jr. |
| 2015/0359061 A1 | 12/2015 | Adler |
| 2016/0007420 A1 | 1/2016 | Gong et al. |
| 2016/0323949 A1 | 11/2016 | Lee |
| 2016/0363308 A1* | 12/2016 | Shum .................... F21V 23/003 |
| 2016/0366746 A1* | 12/2016 | van de Ven ............ F21V 7/00 |
| 2016/0374177 A1 | 12/2016 | Chen |
| 2017/0019973 A1 | 1/2017 | Beck et al. |
| 2017/0027033 A1 | 1/2017 | Chobot et al. |
| 2017/0086265 A1 | 3/2017 | Akiyama et al. |
| 2017/0086280 A1 | 3/2017 | Boomgaarden et al. |
| 2017/0135186 A1 | 5/2017 | O'Neil et al. |
| 2017/0164440 A1 | 6/2017 | Hu et al. |
| 2017/0238392 A1 | 8/2017 | Shearer et al. |
| 2017/0303363 A1 | 10/2017 | Pyshos et al. |
| 2018/0035510 A1 | 2/2018 | Doheny et al. |
| 2018/0116029 A1 | 4/2018 | Pyshos et al. |
| 2018/0166026 A1 | 6/2018 | Kumar et al. |
| 2018/0242422 A1 | 8/2018 | Choi et al. |
| 2018/0249547 A1* | 8/2018 | Wang .................... H05B 45/46 |
| 2018/0310381 A1 | 10/2018 | Bowen et al. |
| 2018/0368232 A1 | 12/2018 | Doheny et al. |
| 2019/0027099 A1 | 1/2019 | Kumar et al. |
| 2019/0037663 A1 | 1/2019 | Van Winkle |
| 2019/0088213 A1 | 3/2019 | Kumar et al. |
| 2019/0141812 A1* | 5/2019 | Chen .................... H05B 39/044 |
| 2019/0191512 A1* | 6/2019 | Zeng ..................... F21S 4/22 |
| 2019/0268984 A1* | 8/2019 | Song ..................... H02M 3/156 |
| 2019/0268991 A1 | 8/2019 | Li |
| 2019/0394851 A1 | 12/2019 | Sinphay |

FOREIGN PATENT DOCUMENTS

| | | |
|---|---|---|
| EP | 2728972 | 8/2015 |
| JP | 2011258517 | 12/2011 |
| WO | 2011084135 | 7/2011 |

OTHER PUBLICATIONS

U.S. Appl. No. 16/022,892, "Notice of Allowance," dated Mar. 7, 2019, 9 pages.

U.S. Appl. No. 16/059,606, "Non-Final Office Action," dated Feb. 11, 2019, 12 pages.

U.S. Appl. No. 16/022,892, "Notice of Allowance," dated Jun. 10, 2019, 8 pages.

(56) References Cited

OTHER PUBLICATIONS

"2×4 LED Flat Panel", Main Place Lighting, Available Online at: https://shopmainplacelighting.com/collections/commercial-lighting/products/2-x-4-led-flat-panel-1, Accessed From Internet on: May 14, 2019, 3 pages.

"38W LED Panel—Color Selectable", Venture Lighting, Available Online at: https://www.venturelighting.com/led-lighting/indoor-lighting-fixtures/panels-and-troffers/color-selectable-panels/standard-product-pn38592.html, Mar. 19, 2019, 9 pages.

"EASY Lighting Control", Application Guide, OSRAM, Available Online at: www.osram.com/easy, Apr. 2015, 25 pages.

"Human Centric Lighting", HELVAR, Intelligent Colour Product Series, Brochure, Available Online at: https://www.helvar.com/media/filer_public/91/04/9104b3d6-392b-461a-aa48-dd073d33c76b/hcl_flyer-brochure.pdf, Dec. 4, 2017, 1 page.

"IW Cove MX Powercore—Premium Interior Linear LED Cove and Accent Luminaire with Intelligent White Light", Philips Lighting,Product Family Leaflet, Nov. 20, 2017, 4 pages.

"LED Panel 1230 40W Colour Changeable", Fuzion Lighting, Information sheet, Available online at: http://www.fuzionlighting.com.au/product/led-panel-40-cct Mar. 19, 2019, 6 pages.

"Noble Pro LED Line Voltage Task Lighting NLLP Series", AFX, R6/17, Ordering sheet, Available Online at: www.AFXinc.com., Accessed From Internet on May 13, 2019, 1 page.

"Viacon Led-Products", Venture Lighting, Available Online at: https://www.trilux.com/en/products/viacon-led/, Accessed from Internet on: May 13, 2019, 10 pages.

"Par Lite Led", VariWhite, Coemar, User Manual Version 1.0, Jun. 2011, 19 pages.

"Led Universal Ceiling Fan Light Kit", Hampton Bay, Use and Care Guide, 22 pages.

"LLP LED Light Panel", Main Place Lighting, Specification Sheet, Available Online at: https://cdn.shopify.com/s/files/1/2048/2207/files/LLP-Specification-Sheet-1.pdf, Mar. 19, 2019, 4 pages.

CA3,046,771 , "Office Action", dated Feb. 20, 2020, 7 pages.

U.S. Appl. No. 16/059,606 , "Non-Final Office Action", dated May 15, 2020, 17 pages.

U.S. Appl. No. 16/021,627, "Non Final Office Action," dated Aug. 29, 2018, 14 pages.

U.S. Appl. No. 16/811,076 , Non-Final Office Action, dated Jun. 24, 2020, 16 pages.

Application No. CA3,040,908, Office Action, dated May 21, 2020, 3 pages.

\* cited by examiner

US 10,856,384 B2

LIGHTING SYSTEM WITH CONFIGURABLE COLOR TEMPERATURES

TECHNICAL FIELD

This disclosure relates generally to lighting systems having multiple groups of light-emitting diodes that can be configured to produce illumination of different color temperatures. More specifically, but not by way of limitation, this disclosure relates to lighting systems in which the color temperature of the illumination can be selectively modified.

BACKGROUND

Lighting systems include light-emitting diodes ("LEDs") that provide high-quality lighting despite a compact size. Different groups of light-emitting diodes can have different color temperatures. Thus, lighting fixtures, such as luminaries, are often manufactured in different configurations that provide different color temperatures that a customer can choose. But stocking LED-based fixtures or other light sources to accommodate various desirable color temperatures can require maintaining a relatively large or cumbersome inventory.

SUMMARY

Certain aspects involve lighting systems in which the color temperature of the illumination can be selectively modified. In one example, a lighting system can include a set of light sources. The lighting system can also include a switching device. The switching device can connect different light sources from the set into light-source combinations having different color temperatures, respectively. A light-source combination can include two of the light sources connected in series. Each light-source combinations could, for instance, emit light at a target lumen output common to the light-source combinations.

These illustrative aspects are mentioned not to limit or define the disclosure, but to provide examples to aid understanding thereof. Additional aspects are discussed in the Detailed Description, and further description is provided there.

BRIEF DESCRIPTION OF THE DRAWINGS

Features, aspects, and advantages of the present disclosure are better understood when the following Detailed Description is read with reference to the accompanying drawings.

DETAILED DESCRIPTION

Certain aspects involve lighting systems in which the color temperature of the illumination can be selectively modified. For instance, a luminaire can have a set of light-emitting diode ("LED") groups or other light sources that are connectable in different combinations to provide different color temperatures. The luminaire could be designed to provide a constant (or relatively constant) lumen output for different color temperatures. For instance, a luminaire could have a specified output of 1000 lumens, within a given tolerance. One or more switches in the luminaire could connect different LED groups (or other light sources) from the set into light-source combinations having different color temperatures. Each light-source combination can include at least two of the LED groups connected in series and can emit light at a lumen output within the tolerance of the target lumen output (e.g., at or around 1000 lumens).

In some aspects, different light-source combinations can be activated by "replacing" one light source (e.g., an LED group) with a different light source (e.g., a different LED group) in an active light-source combination. Activating a light-source combination can include causing current to flow through multiple light sources in the light-source combination such that the light-source combination outputs a target color temperature. In one example involving a first light source connected in series with a second light source, a change in a switching state can disconnect the second light source from the current driver. The change in switching state can also connect a third light source in series with the first light source. In another example, the second light source could be "replaced" in the given light-source combination by connecting, via a switch, a third light source in parallel with the second light source. The third light source can have a lower forward voltage than the second light source, which can cause a significantly larger current flow through the third light source as compared to the second light source. In this manner, color temperature and lumen output are produced by the first and third light sources, even though the second light source remains connected to the first light source.

In some aspects, replacing light sources in an active light-source combination can reduce costs or other resource expenditures for manufacturing a lighting system with a configurable color temperature. In a simplified example, if a target lumen output of 1000 lumens is desirable, a luminaire with three 500-lumen light sources connectable in different combinations could reduce required expenditures as compared to a luminaire that switches between a first complete 1000-lumen light source and a second complete 1000-lumen LED.

Figure 1:
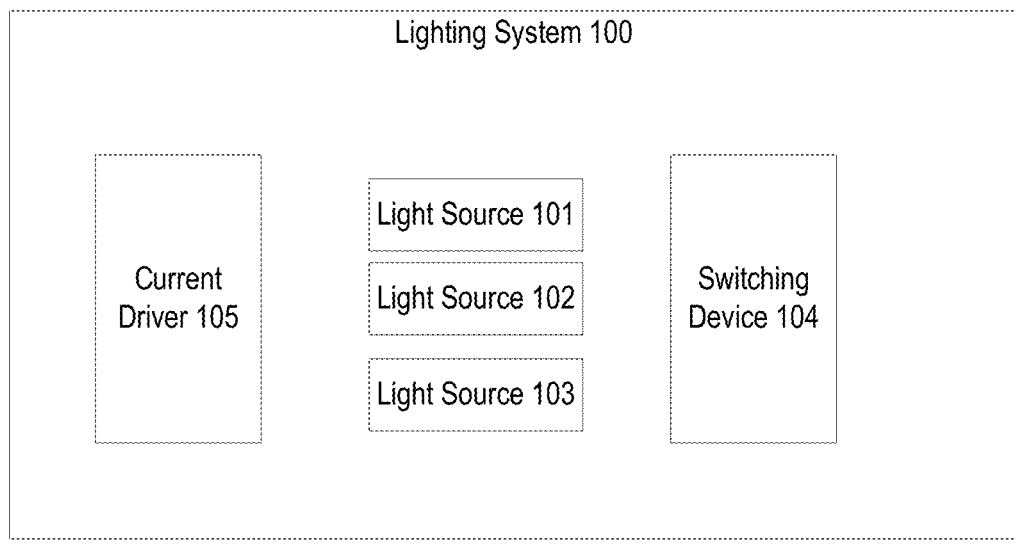
FIG. 1 depicts an example of a lighting system in which different light-emitting diode ("LED") groups can be combined to produce illumination having different color temperatures, according to certain aspects of the present disclosure.

Referring now to the drawings, FIG. 1 depicts an example of a lighting system 100 in which different LED groups can be combined to produce illumination having different color temperatures. An example of a lighting system 100 is a luminaire. The lighting system 100 can include a set of light sources 101-103. The lighting system 100 can also include a switching device 104. The switching device 104 can have different configurations.

A given configuration of the switching device 104 can connect, into a light-source combination, at least one of the light sources 101-103 to at least another one of the light sources 101-103. In some aspects, each light-source combination includes at least two of the LED groups connected in series. Illumination of a particular light-source combination can provide a respective color temperature. In this manner, the switching device 104 can connect different LED groups into light-source combinations having different color temperatures, respectively.

In some aspects, the lighting system 100 can be configured such that each light-source combination from at least some of the light-source combinations emits light at a common lumen output. For instance, a first light-source combination can include light sources 101 and 102, and a second light-source combination can include light sources 102 and 103. The first and second LED groups can emit light at a common lumen output. In some aspects, the common lumen output is an identical lumen output for both light-source combinations. In additional or alternative aspects, the common lumen output involves the two light-source combinations emit light within a specified range of lumen outputs or within a threshold of a target lumen output. In some aspects, the range of lumen outputs or threshold of the target lumen output can be constrained or otherwise selected such that a difference in lumen outputs by different light-source combinations is not perceptible to a person. In additional or alternative aspects, the range of lumen outputs or threshold of the target lumen output can be constrained or otherwise selected such that a difference in lumen outputs by different light-source combinations still result in sufficient illumination required for completing a specified task. Examples of differences in lumen outputs by different light-source combinations that can be used to implement various aspects include differences within a tolerance of 10%, differences within a tolerance of 20%, differences within a tolerance of 25%, etc.

The lighting system 100 can also include a current driver 105. The current driver 105 can include one or more devices that provide or regulate power to the light sources 101-103. In some aspects, the switching device 104 can change a configuration of the lighting system 100 by adding or changing connections in a circuit that includes the current driver 105 and one or more of the light sources 101-103.

In one example, changing a state of the switching device 104 can disconnect, from the current driver 105, one of the light sources included in a first light-source combination. Disconnecting one of these light sources can deactivate the first light-source combination. Deactivating a light-source combination can include causing a reduction in current flow through one or more light sources in the light-source combination such that the deactivated light-source combination does not output its corresponding target color temperature. A reduction in current flow could include reducing the current flow to zero or to a non-zero value. This change in the state of the switching device 104 can also connect, to the current driver 105, another one of the light sources and thereby activate a second light-source combination. In this manner, changing a state of the switching device 104 can replace one light source with a different light source in an active light-source combination. Changing a state of the switching device 104 can also disconnect, from the current driver 105, one of the light sources included in a first light-source combination. Disconnecting one of these light sources can deactivate the first light-source combination. This change in the state of the switching device 104 can also connect, to the current driver 105, another one of the light sources and thereby activate a second light-source combination. In this manner, changing a state of the switching device 104 can replace one light source with a second light source in an active light-source combination.

In another example, changing a state of the switching device 104 can cause a larger amount of current flow through a newly activated light source as compared to a currently activated light source. For instance, a given light-source combination could include a first light source and a second light source. The second light source could be "replaced" in the given light-source combination by connecting, via the switching device 104, a third light source in parallel with the second light source, where the third light source has a lower forward voltage than the second light source. If the forward voltage differential between the second and third light sources is large enough, a significantly large amount of current can flow through the third light source than the second light source, such that the second light source's contribution to an outputted color temperature is low or nonexistent. In this manner, changing a state of the switching device 104 can "replace" the second light source with the third light source in an active light-source combination, even though the second light source remains connected to the first light source.

A light source can include any device that can emit light, where light emitted at different color temperatures by different light sources can be combined to provide another color temperature. For illustrative purposes, certain examples described herein with respect to FIGS. 2-9 involve light sources that are LED groups. But other implementations are possible. Examples of a light source can include one or more LEDs, one or more halogen lighting devices, one or more incandescent lighting devices, one or more laser diodes, one or more organic light emitting diodes, and other light-emitting devices. The particular examples of light sources depicted and/or described herein with respect to FIGS. 2-9 can be replaced with one or more other light sources without departing from the scope of this disclosure.

A switching device 104 can include any mechanism, device, or group of devices that can have different configurations that change one or more connections in one or more electrical circuits of a lighting system. For illustrative purposes, certain examples described herein with respect to FIGS. 2-9 involve switches with one or more throws and poles, slide switches, transistors, etc. But any suitable implementation involving a mechanism, device, or group of devices that change one or more connections in one or more electrical circuits of a lighting system can be used. The particular examples of switching devices depicted and/or described herein with respect to FIGS. 2-9 can be replaced with one or more other switching devices without departing from the scope of this disclosure.

Figure 2:
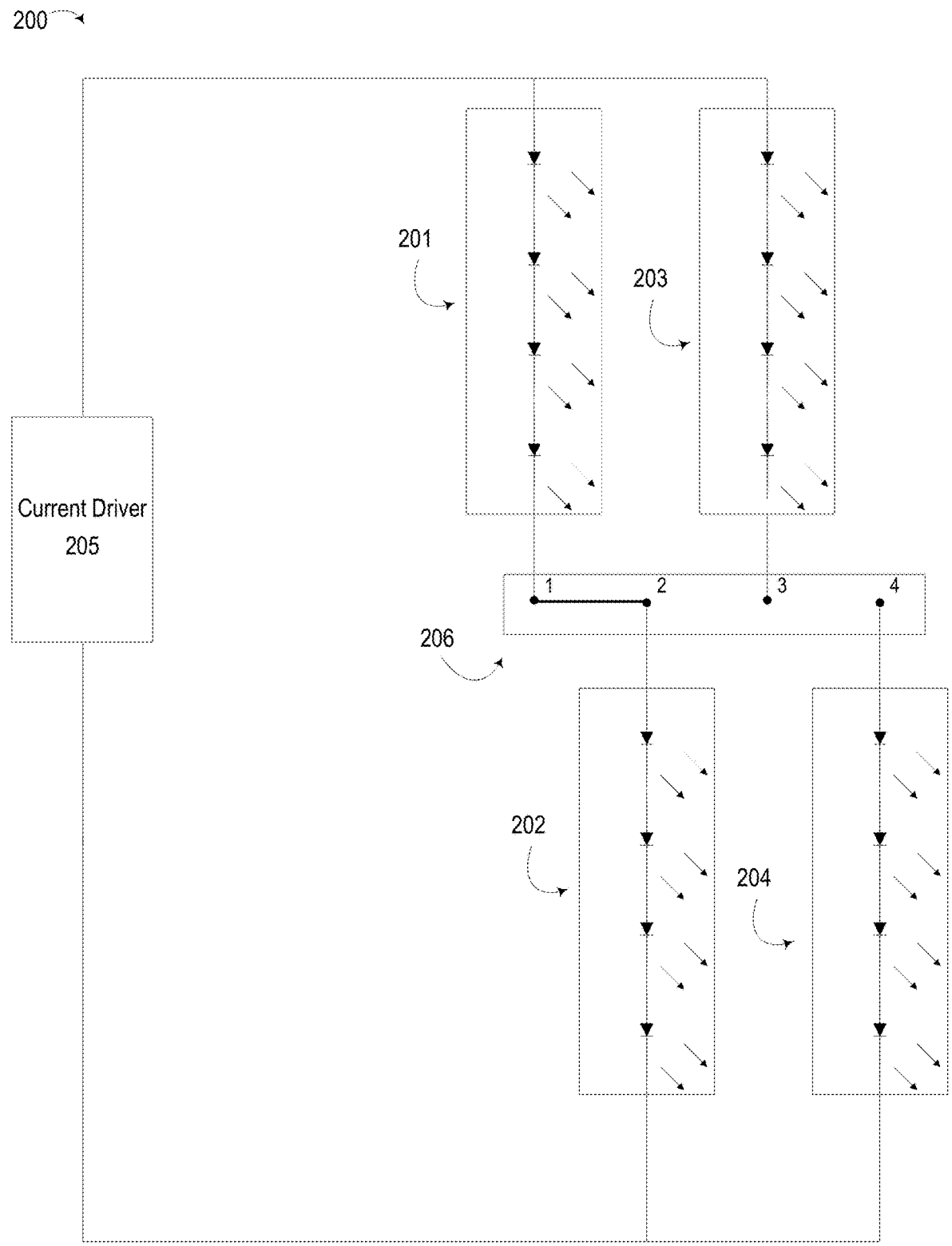
FIG. 2 depicts an example of an implementation of the lighting system from FIG. 1 in which a slide switch at a first position can be used to connect different LED groups having different color temperatures, according to certain aspects of the present disclosure.

FIG. 2 depicts a lighting system 200 that is an example of implementing the lighting system 100. The lighting system 200 can include LED groups 201-204. The lighting system 200 can also include a switch 206 that can selectively connect different combinations of the LED groups 201, 202, 203, 204. The switch 206 can selectively connect different light-source combinations to a current driver 205. In some aspects, the switch 206 can be a slide switch. An example of a slide switch is switch with a single pole and multiple throws (e.g., single-pole/double-throw, single-pole/triple-throw, etc.). In some aspects, the current driver 205 can be a constant current driver.

In the example depicted in FIG. 2, the switch 205 has a configuration that activates a first light-source combination. The first light-source combination can include the LED groups 201 and 202 connected in series. The switch 206 can have a position or other configuration in which an open path exists between the LED group 203 and the current driver 205, an open path exists between the LED group 204 and the current driver 205, and a closed path includes the LED group 201, the LED group 202, and the current driver 205.

Figure 3:
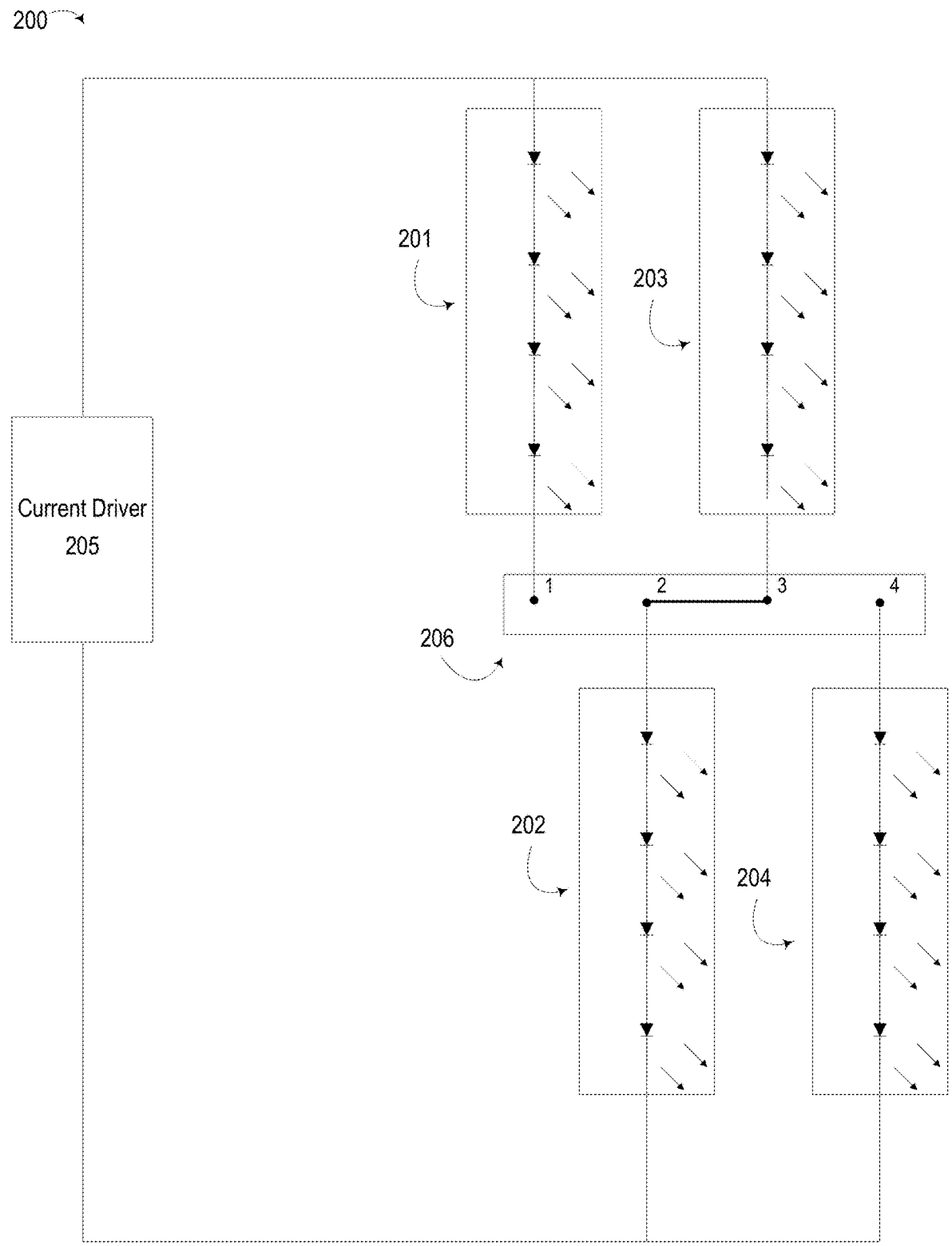
FIG. 3 depicts the lighting system of FIG. 2 in which the slide switch is at a second position providing an alternative combination of LED groups, according to certain aspects of the present disclosure.

FIG. 3 depicts the lighting system 200 having a configuration in which the switch 206 is at a second position providing an alternative combination of LED groups. Changing the switch 206 from a first position, depicted in FIG. 2, to a second position, depicted in FIG. 3, can cause the LED group 201 to be replaced with the LED group 203. In this example, the light-source combination can include the LED groups 202 and 203 connected in series. The switch 206 can have a position or other configuration in which an open path exists between the LED group 201 and the current driver 205, an open path exists between the LED group 204 and the current driver 205, and a closed path includes the LED group 202, the LED group 203, and the current driver 205.

Figure 4:
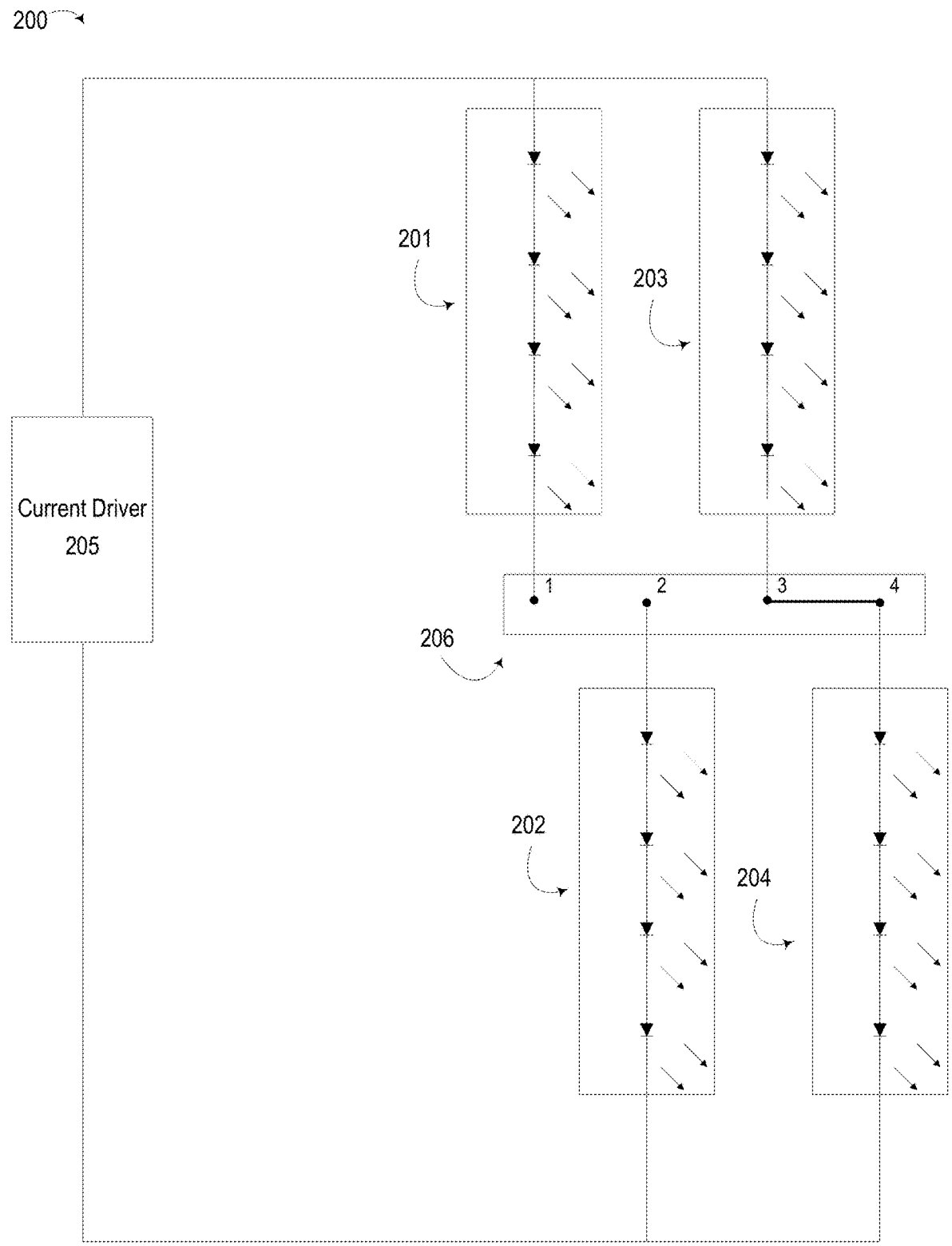
FIG. 4 depicts the lighting system of FIG. 2 in which the slide switch is at a third position providing another alternative combination of LED groups, according to certain aspects of the present disclosure.

FIG. 4 depicts the lighting system 200 having a configuration in which the switch 206 is at a third position providing another alternative combination of LED groups. Changing the switch 206 from a second position, depicted in FIG. 3, to a third position, depicted in FIG. 4, can cause the LED group 202 to be replaced with the LED group 204. In this example, the light-source combination includes the LED groups 203 and 204 connected in series. The switch 206 can have a position or other configuration in which an open path exists between the LED group 201 and the current driver 205, an open path exists between the LED group 202 and the current driver 205, and a closed path includes the LED group 203, the LED group 204, and the current driver 205.

In the examples depicted in FIGS. 2-4, the different light-source combinations can cause the lighting system 200 to emit light at different color temperatures, respectively. Table 1 provides an example of the total combined color temperature ("CCT"), in degrees Kelvin, for each of the different switch configurations described above (i.e., position 1 from FIG. 2, position 2 from FIG. 3, and position 3 from FIG. 4). In some aspects, each of the light-source combinations can emit light at a lumen output common to the light-source combination and the light-source combination, as described above with respect to FIG. 1.

TABLE 1

| Switch position | LED Group 201 (3000K) | LED Group 202 (3000K) | LED Group 203 (4000K) | LED Group 204 (4000K) | Total CCT |
|---|---|---|---|---|---|
| 1 (LEDS groups 201 and 202 connected) | ON | ON | OFF | OFF | 3000K |
| 2 (LEDS groups 202 and 203 connected) | OFF | ON | ON | OFF | 3500K |
| 3 (LEDS groups 203 and 204 connected) | OFF | OFF | ON | ON | 4000K |

Figure 5:
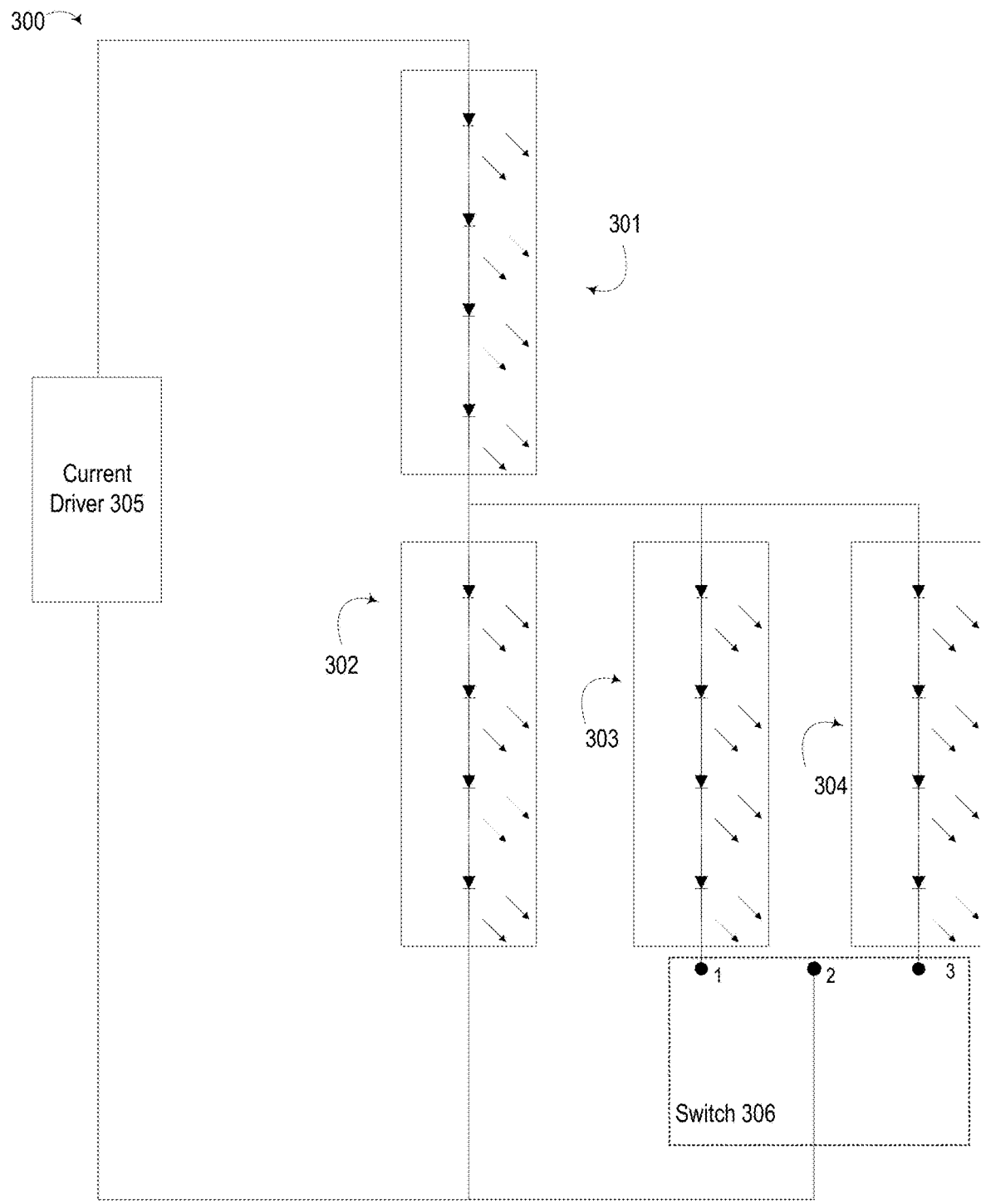
FIG. 5 depicts another example of an implementation of the lighting system from FIG. 1 in which at least one LED group is used to form different light-source combinations with other LED groups, according to certain aspects of the present disclosure.

FIG. 5 depicts a lighting system 300 that is another example of implementing the lighting system 100. The lighting system 300 can include LED groups 301, 302, 303, 304. In this example, at least one LED group (e.g., LED group 301) is used to form different light-source combinations with the other LED groups (e.g., LED groups 302, 303, 304). In this example, the switch 306 is positioned out of a closed path that includes the LED group 301, the LED group 302, and the current driver 305. The switch 306 is also positioned, in this example, in a first path that includes the LED group 301, the LED group 303, and the current driver 305. The switch 306 is also positioned, in this example, in a second path that includes the LED group 301, the LED group 304, and the current driver 305. For instance, the switch 306 and the LED group 303 are connected in series to the current driver 305, and the switch 306 and the LED group 304 are connected in series to the current driver 305.

Each position (or other configuration) of the switch 306 can allow current flow through the LED group 301 and at least one other LED group from LED groups 302-304. For instance, FIG. 5 depicts a first light-source combination that can include the LED group 301 and the LED group 302. In this example, the switch 306 has a configuration in which an open path exists between the LED group 303 and the current driver 305, and another open path exists between the LED group 304 and the current driver 305. An example of this switch configuration is setting the switch 306 to a position 2, as depicted in FIG. 5.

Figure 6:
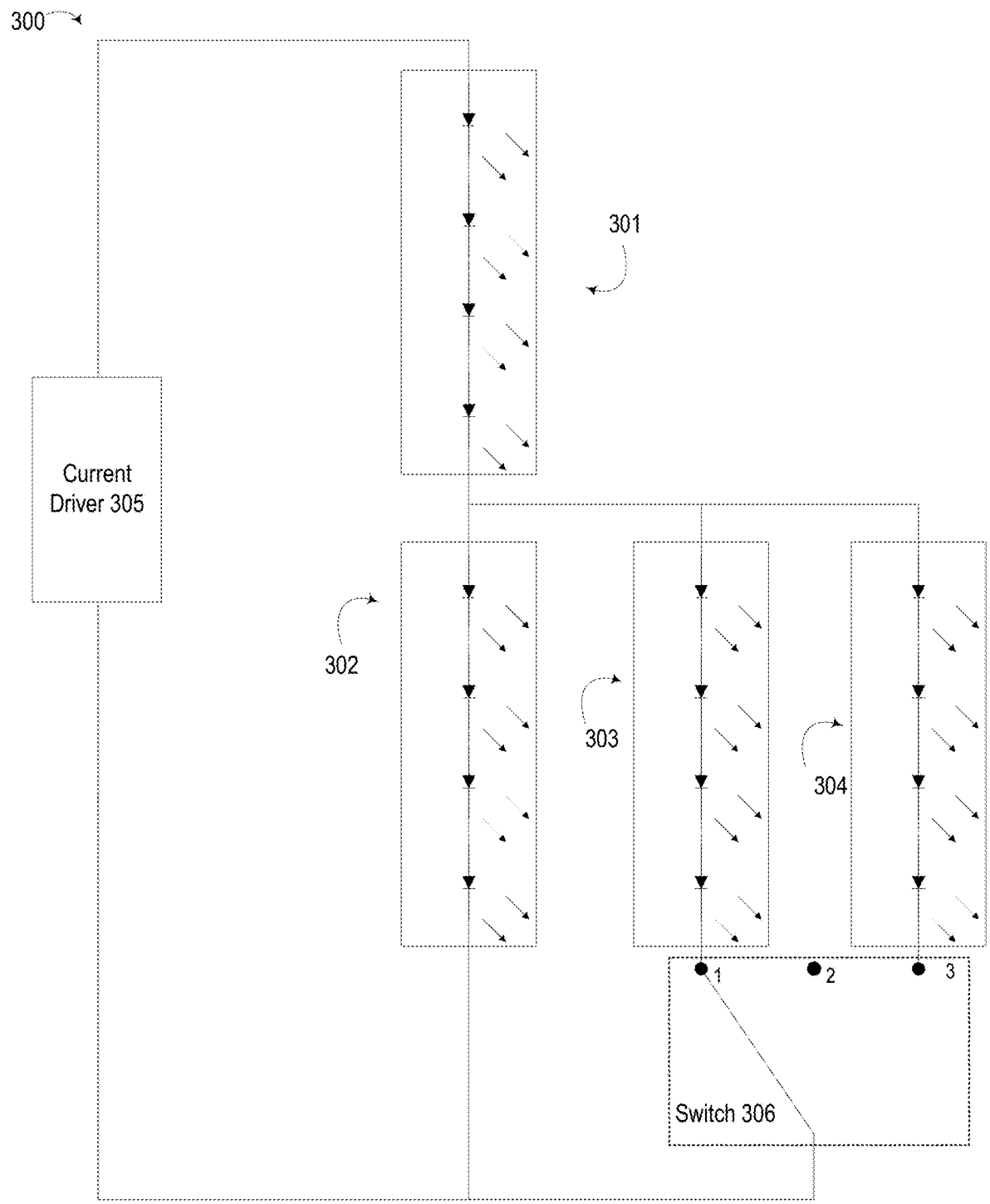
FIG. 6 depicts the lighting system of FIG. 5 in which the switch is at a position providing an alternative combination of LED groups, according to certain aspects of the present disclosure.

FIG. 6 depicts a first second group combination that can include the LED group 301 and the LED group 303. In this example, the switch 306 has a configuration in which a closed path exists between the LED group 303 and the current driver 305, and an open path exists between the LED group 304 and the current driver 305. An example of this switch configuration is setting the switch 306 to a position 1, as depicted in FIG. 6.

Figure 7:
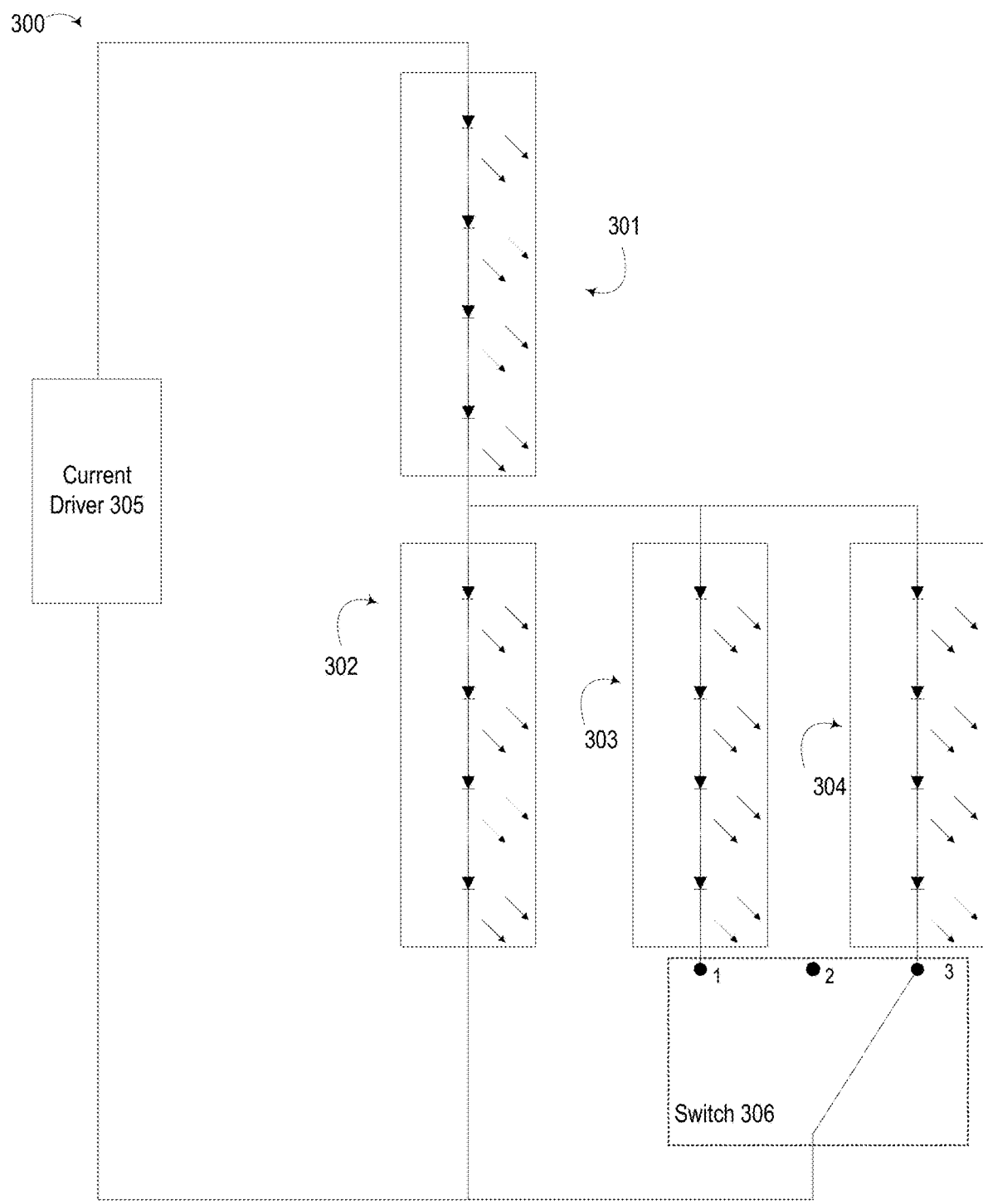
FIG. 7 depicts the lighting system of FIG. 5 in which the switch is at a position providing another alternative combination of LED groups, according to certain aspects of the present disclosure.

FIG. 7 depicts a first second group combination that can include the LED group 301 and the LED group 304. In this example, the switch 306 has a configuration in which an open path exists between the LED group 303 and the current driver 305, and a closed path exists between the LED group 304 and the current driver 305. An example of this switch configuration is setting the switch 306 to a position 3, as depicted in FIG. 7.

In some aspects, forward voltage differentials can be used to maintain a constant or near-constant lumen output across the different light-source combinations. For instance, a first differential can exist between the forward voltage of the LED group 302 and the forward voltage of the LED group 303. A second differential, which could be the same as or different from the first differential, can exist between the forward voltage of the LED group 302 and the forward voltage of the LED group 304. Each forward voltage differential can be sufficient (e.g., greater than or equal to three volts, less than three volts and greater than or equal to one volt, etc.) to cause a larger amount of current to flow through the LED groups 303 or 304, as compared to the current flow through the LED group 302, when a closed path exists between the LED groups 303 or 304 and the current driver 305.

For instance, if a closed path exists between the LED group 303 and the current driver 305, such that the LED group 303 is connected in series with the LED group 301 and in parallel with the LED group 302, a forward voltage differential between the LED groups 302 and 303 can cause a reduced amount of current flow through LED group 302 as compared to LED group 303. In some aspects, the forward voltage differential between LED groups 302 and 303 can be sufficient to prevent the LED group 302 from emitting light when the closed path exists between the LED group 303 and the current driver 305. In additional or alternative aspects, the forward voltage differential between LED groups 302 and 303 can be sufficient to prevent the emission of light from the LED group 302 from contributing to (or otherwise visibly impacting) the color temperature of the light emitted by the combination of LED groups 301 and 302. In additional or alternative aspects, the forward voltage differential between LED groups 302 and 303 can be sufficient to prevent the emission of light from the LED group 302 from causing a total lumen output of the lighting system 300 from exceeding a target lumen output plus a threshold tolerance, described above with respect to FIG. 1. (A similar scenario can occur if a closed path exists between the LED group 304 and the current driver 305, such that the LED group 304 is connected in series with the LED group 301 and in parallel with the LED group 302.)

In the examples depicted in FIGS. 5-7, the different light-source combinations can cause the lighting system 300 to emit light at different color temperatures, respectively. Table 2 provides an example of the total CCT, in degrees Kelvin, for each of the different switch configurations described above (i.e., position 1 from FIG. 6, position 2 from FIG. 5, and position 3 from FIG. 7). In some aspects, each of the light-source combinations can emit light at a lumen output common to the light-source combination and the light-source combination, as described above with respect to FIG. 1.

TABLE 2

| Switch position | LED Group 301 (3000K) | LED Group 302 (3000K) | LED Group 303 (4000K) | LED Group 304 (5000K) | Total CCT |
|---|---|---|---|---|---|
| 1 | ON | OFF | ON | OFF | 3500K |
| 2 | ON | ON | OFF | OFF | 3000K |
| 3 | ON | OFF | OFF | ON | 4000K |

Figure 8:
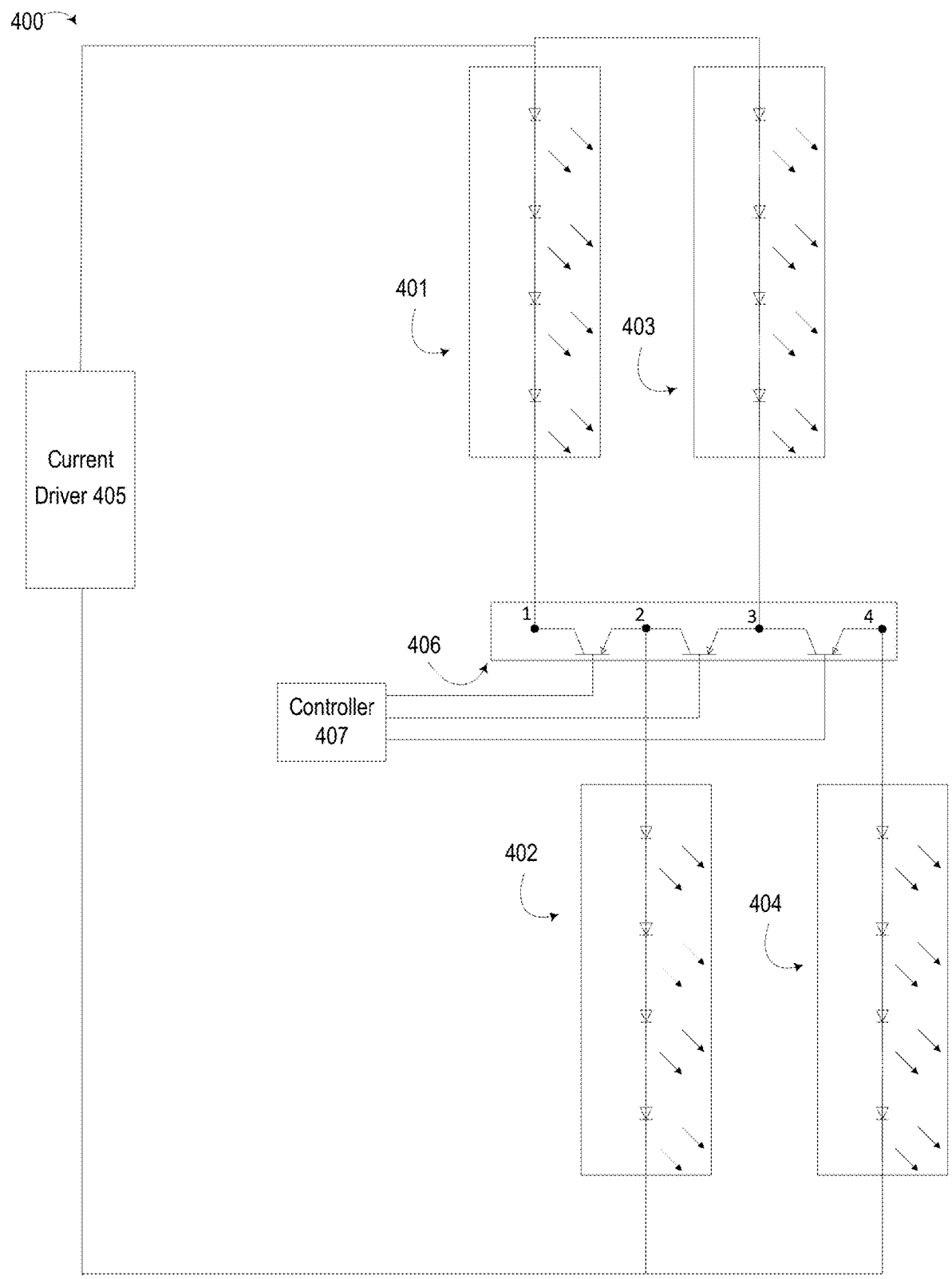
FIG. 8 depicts another example of an implementation of the lighting system from FIG. 1 in which a switching device is implemented using a set of transistors, according to certain aspects of the present disclosure.

In some aspects, a switching device can include one or more transistors. For instance, FIG. 8 depicts a lighting system 400 that is another example of implementing the lighting system 100. The lighting system 400 can include LED groups 401, 402, 403, 404.

In this example, a switching device 406 is used to connect different sets of the LED groups 401, 402, 403, 404 based on one or more control signals from a controller 407. The switching device 406 can include different transistors that can be activated using the controller 407. A control signal can include any signal that causes a change in state of a transistor. Examples of control signals include a voltage applied to a transistor, a wireless signal (e.g., Bluetooth) that can configure a device to change a voltage applied to a transistor, etc.

The switching device 406 can have different configurations corresponding to different sets of states of the transistors. In a first configuration, a transistor between points 1 and 2 can be set to an "on" state, and other transistors can be set to "off" states. The first configuration can include allowing current to flow, via the transistor in the "on" state, through LED groups 401 and 402 connected in series. In a second configuration, a transistor between points 2 and 3 can be set to an "on" state, and other transistors can be set to "off" states. The second configuration can include allowing current to flow, via the transistor in the "on" state, through LED groups 402 and 403 connected in series. In a third configuration, a transistor between points 3 and 4 can be set to an "on" state, and other transistors can be set to "off" states. The third configuration can include allowing current to flow, via the transistor in the "on" state, through LED groups 403 and 404 connected in series.

Figure 9:
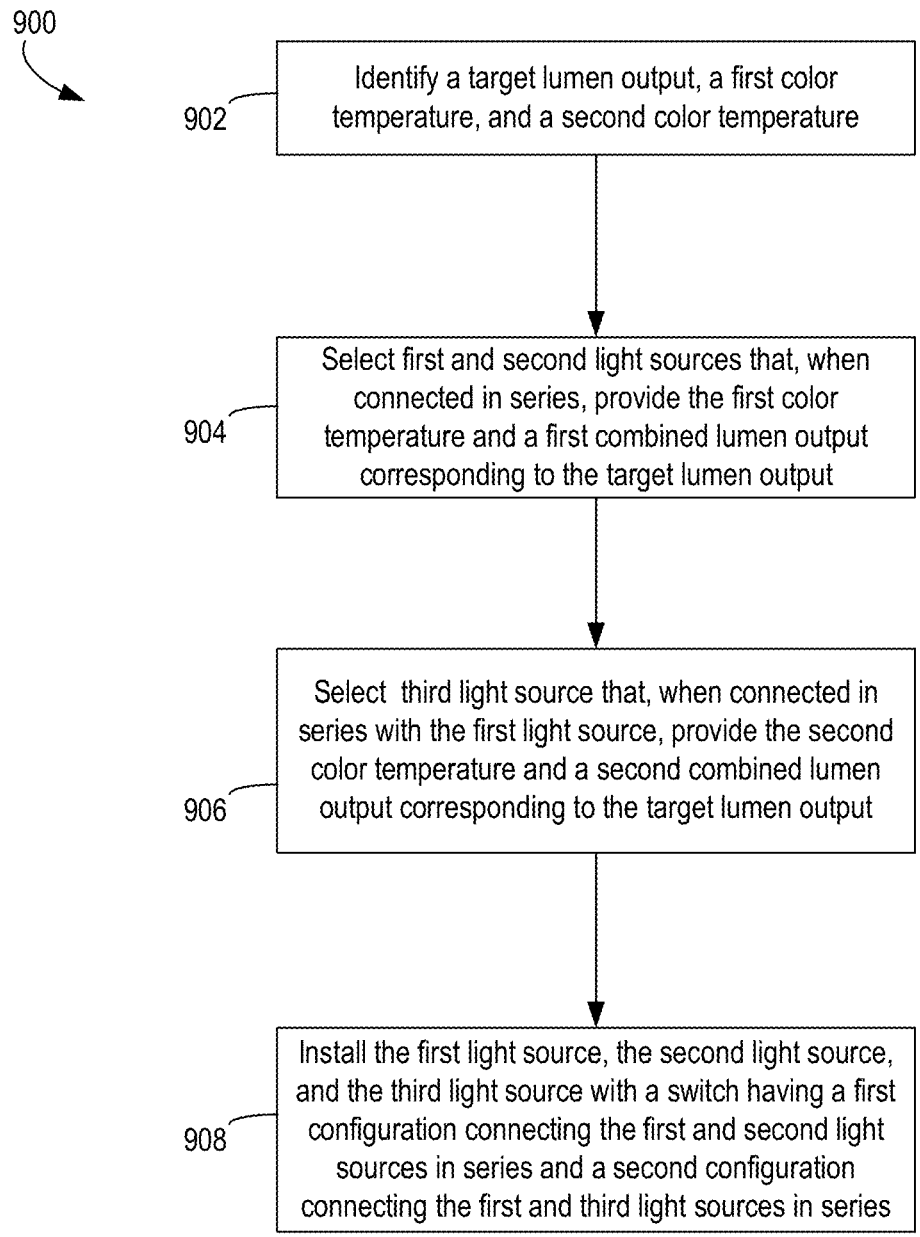
FIG. 9 depicts an example of a method for manufacturing one or more lighting systems in which different LED groups can be combined to produce illumination having different color temperatures.

FIG. 9 depicts an example of a method 900 for manufacturing a lighting system in which the color temperature of the illumination can be selectively modified. The method 900 can be used to manufacture one or more of the lighting systems 100, 200, 300, and 400, as well as variants thereof. For illustrative purposes, the method 900 is described with respect to the examples depicted in FIGS. 1-8. But other implementations are possible.

At block 902, the method 900 can include identifying a target lumen output, a first color temperature, and a second color temperature. In some aspects, identifying these values can involve accessing these values from files. In one example, a computing device executing suitable design software can access specification data from one or more files stored in a non-transitory computer-readable medium. In another example, a technician, can access specification data from one or more files. The files can include specifications for a luminaire or other lighting system. The specification data can include, for example, a target lumen output, a first color temperature, and a second color temperature. In some aspects, the specification data can include a threshold tolerance with respect to the target lumen output. Examples of a threshold tolerance include a change in lumen output that is not detectable to a human eye, a manufacturer-specified tolerance, or any other threshold of a target lumen output described above with respect to FIG. 1. The computing device or technician can identify the target lumen output and color temperatures from the specification data. In some aspects, identifying these values can involve a computing device or a technician computing one or more of the target lumen output, the first color temperature, and the second color temperature.

At block 904, the method 900 can include selecting first and second light sources that, when connected in series, provide the first color temperature and a first combined lumen output corresponding to the target lumen output. For example, a computing device executing suitable design software can access hardware data identifying available light sources. The hardware data can identify the color temperature and lumen output of each light source. The computing device can compute a CCT and combined lumen output for one or more combinations of the available light sources identified in the hardware data. The computing device can select one or more of these combinations having the first color temperature and a first combined lumen output corresponding to the target lumen output. A combined lumen output corresponding to the target lumen output can include, for example, the combined lumen output being within the threshold tolerance of the target lumen output. In some aspects, a technician can perform one or more of these operations by selecting data describing the first and second light sources from data stored in paper or electronic files, selecting the physical devices themselves, or some combination thereof.

At block 906, the method 900 can include selecting a third light source that, when connected in series with the first light source, provide the second color temperature and a second combined lumen output corresponding to the target lumen output. For example, a computing device executing suitable design software can access hardware data identifying available light sources. The hardware data can identify the color temperature and lumen output of each light source. The computing device can compute a CCT and combined lumen output for the first light source from block 904 in combination with one or more of the available light sources identified in the hardware data. The computing device can select one or more of these combinations having the second color temperature and a second combined lumen output corresponding to the target lumen output. A combined lumen output corresponding to the target lumen output can include, for example, the combined lumen output being within the threshold tolerance of the target lumen output. In some aspects, a technician can perform one or more of these operations by selecting data describing the third light source from data stored in paper or electronic files, selecting the physical devices themselves, or some combination thereof.

At block 908, the method 900 can include installing the first light source, the second light source, and the third light source with a switch having a first configuration connecting the first and second light sources in series and a second configuration connecting the first and third light sources in series. For example, the computing device can output a schematic diagram or other data that includes the first, second, and third light sources and one or more circuits that include these light sources. The schematic diagram or other data can also include one or more switching devices positioned such that a first light-source combination and a second light-source combination can be activated, where each light-source combination provides a specified color temperature and a combined lumen output within the threshold tolerance of the target lumen output.

In some aspects, the outputted schematic diagram or other data can be provided (e.g., by the computing device or via a transfer on a non-transitory computer-readable medium) to one or more manufacturing systems. A manufacturing system can assemble the first light source, the second light source, and the third light source with a switch into the lighting system. For example, the manufacturing system can position one or more of the light sources, position one or more switches, and connect the light sources and switches to a wiring system (e.g., a printed circuit board or other set of conductors) that implements the outputted schematic diagram or other data.

In additional or alternative aspects, the outputted schematic diagram or other data can be provided (e.g., by the computing device or via a transfer on a non-transitory computer-readable medium) to one or more technicians. The technician can manually assemble the light sources and the switch into the lighting system. For instance, the technician can position one or more of the light sources, position one or more switches, and connect the light sources and switches to a wiring system that implements the outputted schematic diagram or other data.

In some aspects, installing the first light source, the second light source, and the third light source with the switch involves implementing the lighting system 200. For instance, a manufacturing system or technician could position one or more switches between the first light source and the second light source in a first path that includes a current driver. A manufacturing system or technician could also position one or more switches between the first light source and the third light source in a second path that includes the current driver. The switch could be a slide switch, as described above with respect to FIGS. 2-4. The slide switch could have a first position that implements the first configuration and a second position that implements the second configuration.

In additional or alternative aspects, installing the first light source, the second light source, and the third light source with the switch involves implementing the lighting system 300. For instance, a manufacturing system or technician could connect the first light source and the second light source in a first path that includes a current driver. The manufacturing system or technician could connect the second light source and the third light source in parallel, with each of the second light source and the third light source in series with the first light source. The manufacturing system or technician could also position one or more switches outside of the first path and in a second path that includes the first LED, the third LED, and the current driver. The first configuration of an installed switch could cause a first open circuit between the third LED and the current driver, and a second configuration of the installed switch could connect the third LED and the current driver. In these aspects, a computing device that performs operations from the method 900 can identify a forward voltage differential from a forward voltage of the second light source that causes a threshold reduction in current to flow through the second light source. An example of threshold reduction in current flow is a reduction in current that prevents the current flow through the second light source from causing a combined lumen output of the lighting system to exceed the threshold tolerance from the target lumen output. The computing device can select the third light source based on a forward voltage of the third light source creating the forward voltage differential.

In additional or alternative aspects, installing the first light source, the second light source, and the third light source with the switch involves implementing the lighting system 400. For instance, a manufacturing system or technician could install a first light source and install a set of other light sources (e.g., the second and third light sources) connected in parallel with the first light source. The manufacturing system or technician could position one or more switches between a current driver and the set of the other light sources. Different configurations of an installed switch could cause an open circuit between the current driver and a given LED from the set of other light sources.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "computing," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

The foregoing description, including illustrated examples, has been presented only for the purpose of illustration and description and is not intended to be exhaustive or to limit the invention to the precise forms disclosed. Numerous modifications, adaptations, and uses thereof will be apparent to those skilled in the art without departing from the scope of this disclosure. Aspects and features from each example disclosed can be combined with any other example.

The invention claimed is:

1. A lighting system comprising:
   a set of light sources; and
   a switching device configured for connecting different light sources from the set of light sources into light-source combinations having different color temperatures, respectively, wherein each light-source combination:
      comprises two of the light sources connected in series, and
      is configured for emitting light at a target lumen output common to the light-source combinations,
   wherein:
      the lighting system is connectable to a device that provides or regulates power to the set of light sources,
      a first light-source combination comprises a first light source from the set of light sources and a second light source from the set of light sources,
      a second light-source combination comprises the first light source and a third light source from the set of light sources,
      a third light-source combination comprises the first light source and a fourth light source from the set of light sources,
      the switching device is connectable to the device that provides or regulates the power (i) outside of a path that includes the second light source, (ii) in series with the third light source, and (iii) in series with the fourth light source,
      the switching device has a first configuration in which an open path exists between the third light source and the device that provides or regulates the power,
      the switching device has a second configuration in which (i) a closed path exists between the third light source and the device that provides or regulates the power and (ii) an open path exists between the fourth light source and the device that provides or regulates the power,
      the switching device has a third configuration in which (i) a closed path exists between the fourth light source and the device that provides or regulates the power and (ii) the open path exists between the third light source and the device that provides or regulates the power.

2. The lighting system of claim 1, the device that provides or regulates the power comprising a current driver, wherein the switching device is configured for switching between the first light-source combination and the second light-source combination by at least:
   deactivating the first light-source combination by at least causing a reduction in current flow through the second light source included in the first light-source combination;
   activating the second light-source combination by replacing the second light source having the reduction in current flow with the third light source, wherein said replacing comprises connecting the third light source to the current driver;
   wherein the switching device is configured for switching between the first light-source combination and the third light-source combination by at least causing another reduction in current flow through the second light source included in the first light-source combination and connecting the fourth light source to the current driver,
   wherein the switching device is configured for switching between the second light-source combination and the third light-source combination by at least disconnecting the connecting the third light source from the current driver and connecting the fourth light source to the current driver.

3. The lighting system of claim 1, wherein the device that provides or regulates the power comprises a current driver.

4. The lighting system of claim 3, wherein a forward voltage differential between a forward voltage of the second light source and a forward voltage of the third light source is sufficient to cause, when the closed path exists between the third light source and the current driver, a larger amount of current to flow through the third light source than the second light source, wherein a combined lumen output of the first light source, the second light source, and the third light source is within a threshold tolerance of the target lumen output
   wherein an additional forward voltage differential between the forward voltage of the second light source and a forward voltage of the fourth light source is sufficient to cause, when the closed path exists between the fourth light source and the current driver, a larger amount of current to flow through the fourth light source than the second light source, wherein a combined lumen output of the first light source, the second light source, and the fourth light source is within the threshold tolerance of the target lumen output.

5. The lighting system of claim 4, wherein the forward voltage differential is greater than or equal to three volts, wherein the additional forward voltage differential is greater than or equal to three volts.

6. The lighting system of claim 4, wherein the forward voltage differential is less than three volts and greater than or equal to one volt, wherein the additional forward voltage differential is less than three volts and greater than or equal to one volt.

7. The lighting system of claim 3, wherein a forward voltage differential between a forward voltage of the second light source and a forward voltage of the third light source is sufficient to prevent, when the closed path exists between the third light source and the current driver, the second light source from emitting light,
wherein an additional forward voltage differential between the forward voltage of the second light source and a forward voltage of the fourth light source is sufficient to prevent, when the closed path exists between the fourth light source and the current driver, the second light source from emitting light.

8. The lighting system of claim 3, wherein each configuration of the switching device is configured to allow current flow through the first light source and at least one other light source from the set of light sources.

9. A lighting system comprising:
a first light-source combination comprising a first light source in series with a second light source, wherein the first light-source combination is configured for emitting light at a first color temperature;
a second light-source combination comprising the second light source in series with a third light source, wherein the second light-source combination is configured for emitting light at a second color temperature different from the first color temperature;
a third light-source combination comprising the third light source in series with a fourth light source; and
a switching device positioned (i) between the first light source and the second light source, (ii) between the second light source and the third light source and (iii) between the third light source and the fourth light source, the switching device having (i) a first configuration connecting the first light source and the second light source, (ii) a second configuration connecting the second light source and the third light source, a third configuration connecting the third light source and the fourth light source,
wherein the first configuration of the switching device causes (i) a first open path between the third light source and a current driver and (ii) a first closed path that includes the first light source, the second light source, and the current driver,
wherein the second configuration of the switching device causes (i) a second open path between the first light source and the current driver and (ii) a second closed path that includes the second light source, the third light source, and the current driver,
wherein the third configuration of the switching device causes (i) a third open path between the second light source and the current driver and (ii) a third closed path that includes the third light source, the fourth light source, and the current driver.

10. The lighting system of claim 9, wherein the switching device comprises at least one of:
(i) a slide switch movable between a first position, a second position, and a third position, wherein the first configuration comprises the slide switch being in the first position, wherein the second configuration comprises the slide switch being in the second position, wherein the third configuration comprises the slide switch being in the third position, or
(ii) a first transistor, a second transistor, and a third transistor, wherein the first configuration comprises the first transistor being in an "on" state and the second and third transistors being in an "off" state, wherein the second configuration comprises the first and third transistors being in an "off" state and the second transistor being in an "on" state, wherein the third configuration comprises the first and second transistors being in an "off" state and the third transistor being in an "on" state.

11. The lighting system of claim 9, wherein each of the first light-source combination, the second light-source combination, and the third light-source combination is configured for emitting light at a target lumen output common to the first light-source combination, the second light-source combination, and the third light-source combination.

* * * * *